United States Patent [19]

Whaley

[11] 3,987,274

[45] Oct. 19, 1976

[54] PORTABLE WELDING MACHINE FOR WELDING TERMINALS OF TUBES

[76] Inventor: Morris Lamar Whaley, 2605 Faivre, Chula Vista, Calif. 92011

[22] Filed: Oct. 3, 1974

[21] Appl. No.: 511,682

[52] U.S. Cl. ......................... 219/125 R; 219/60 A; 279/2 A
[51] Int. Cl.² ......................................... B23K 9/12
[58] Field of Search .............. 219/60 A, 125 R, 160; 279/2

[56] References Cited
UNITED STATES PATENTS

| | | | |
|---|---|---|---|
| 3,118,052 | 1/1964 | Lippart et al. ............... | 219/125 R X |
| 3,142,745 | 7/1964 | Gotch ............................. | 219/125 R |
| 3,230,340 | 1/1966 | Glatthorn et al. ............ | 219/60 A X |
| 3,300,157 | 1/1967 | Koreishi ........................ | 279/2 X |
| 3,621,182 | 11/1971 | Peyrot ........................... | 219/125 R |
| 3,841,547 | 10/1974 | Bartley ......................... | 219/125 R X |

Primary Examiner—J. V. Truhe
Assistant Examiner—N. D. Herkamp
Attorney, Agent, or Firm—Ralph S. Branscomb

[57] ABSTRACT

A welding machine for welding the terminals of condenser or boiler tubes to plates, automatic in action and self-supporting by reason of an arbor assembly including elongated bar elements, ball bearings and the like, adapted for positive engagement of the interior surface of the tubes adjacent to the terminals and also at points spaced farther along the tube to assure stability of anchoring of the machine with the arbor assembly as its sole support, a motor being operatively connected between the fixed arbor assembly and the frame or body for 360° rotation of the welding tip around the welding seam line where the tube terminals extend slightly beyond the surface of the apertured plate of the condenser or boiler, thus utilizing the terminals and plate.

1 Claim, 5 Drawing Figures

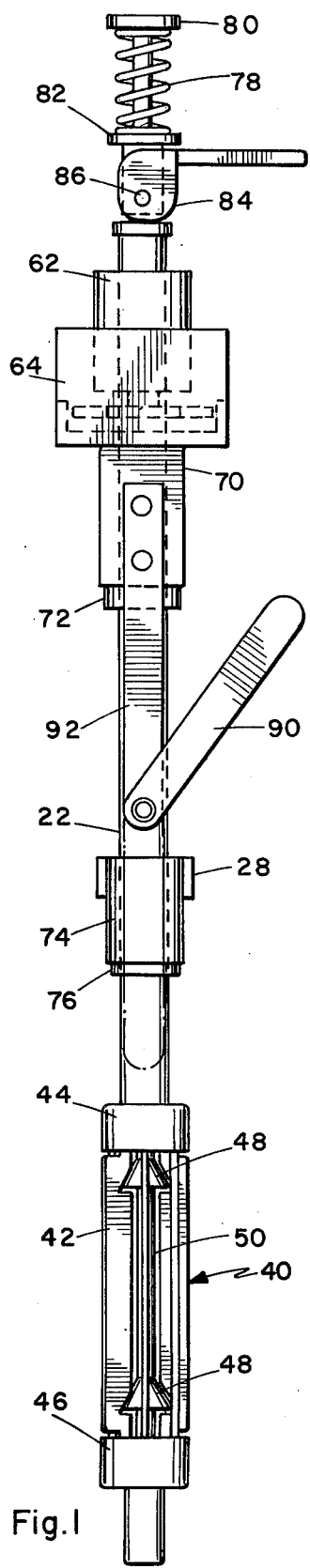
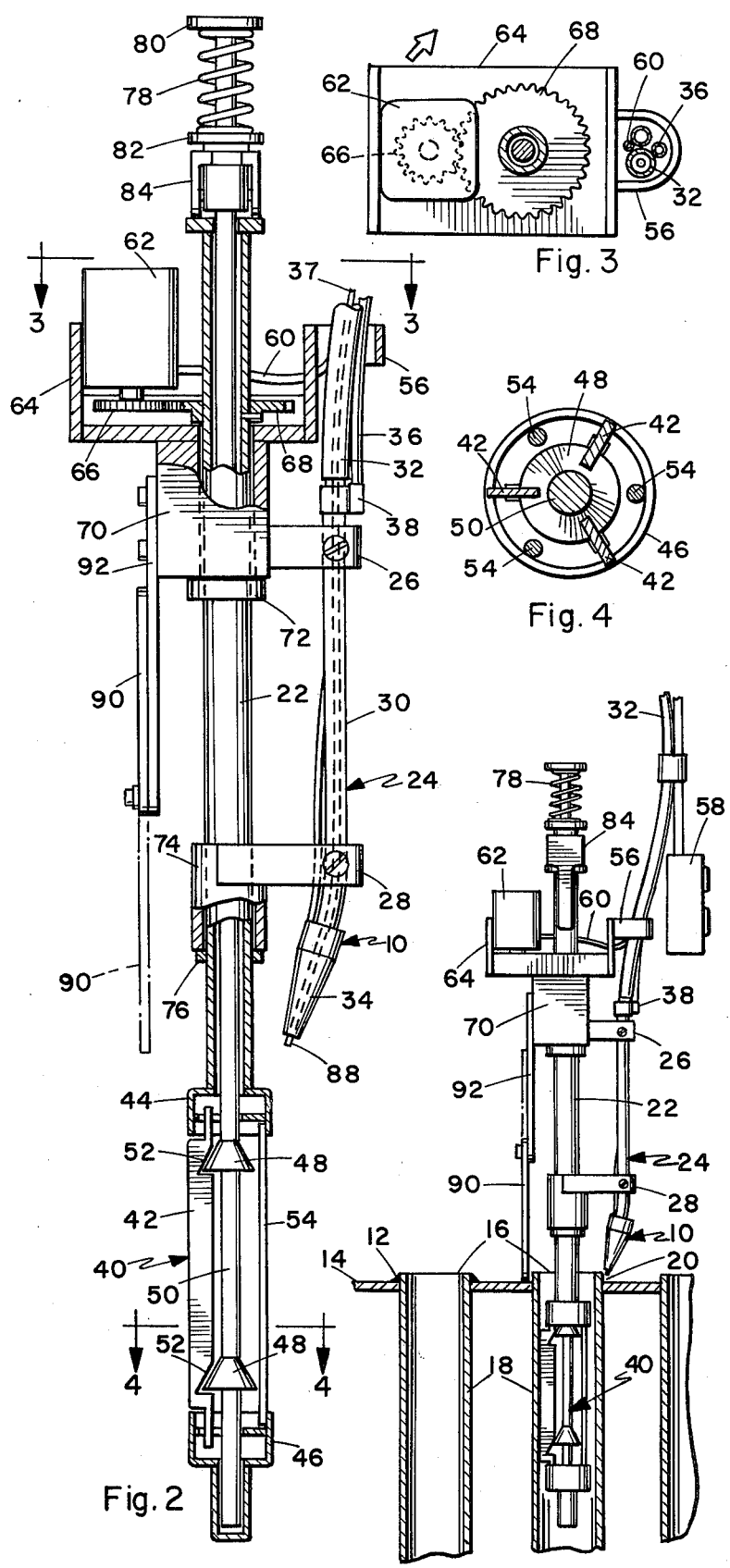
Fig. 1    Fig. 2    Fig. 3    Fig. 4    Fig. 5

PORTABLE WELDING MACHINE FOR WELDING TERMINALS OF TUBES

BACKGROUND OF THE INVENTION

Condensers and boilers ordinarily have a multiplicity of tubes within a shell fashioned from metal plate material apertured to accept the terminal of the tubes, the latter projecting slightly exteriorly of the plate. It has been the customary procedure in manufacturing such condensers and boilers to use a hand-held torch or electric welder to accomplish the welding of these terminals to the plate. With practice, a workman can make a strong, satisfactory weld around each terminal but it is strenuous, tiring work and the welds are always non-uniform and sometimes faulty. There is a need, therefore, for a substantially automatic tube welder which can be quickly and easily shifted by hand from terminal to terminal, satisfactorily rigid and stable in its operative position and capable of making rapid and uniform welds, while requiring the attention of only relatively unskilled workmen.

SUMMARY OF THE INVENTION

As claimed, this invention meets the immediately above mentioned need, the machine comprising a frame or body and a welding head assembly, which term is used herein as generically including not only the welding rod feed for connection to a reel, and a conduit for carbon dioxide or an inert gas but also a conventional welding tip and adjacent gas shield. The machine also includes an anchoring assembly involving a spring-actuated expansible arbor which is placed by the workman successively into the end portions of the tubes, a light weight motor driving the body with the conduits and welding head assembly through a full circle about the arbor as axis so that the welding tip traverses the required annular weld seam line at each terminal, a power line, and simple means to assure proper positioning of the machine with the welding tip at the correct height relative to the welding seam line.

BRIEF DESCRIPTION OF THE DRAWINGS

FIG. 1 is a front view of the complete welding machine;

FIG. 2 is a side elevation view thereof, with portions cut away;

FIG. 3 is a sectional view taken on line 3—3 of FIG. 2;

FIG. 4 is an enlarged sectional view taken on line 4—4 of FIG. 2; and

FIG. 5 is a side elevation view, on a reduced scale, of the unit positioned in a pipe to be welded and proposed as showing the use of the height gauge to achieve the proper positioning of the machine relative to the workpiece and also showing a completed weld.

DETAILED DESCRIPTION OF A PREFERRED EMBODIMENT

This invention is a portable machine in the sense that it can be handcarried and placed in operative position on the workpiece and it is automatic in the sense that the welding head assembly 10 is advanced mechanically at a uniform speed to complete a weld such as that indicated by the weldment 12 in FIG. 5 between the metal shell or plate 14, regularly employed as the outer shell or end plate of a condenser or boiler, and a terminal 16 of a tube such as those tubes indicated at 18 in the same figure. As indicated, the terminal will ordinarily project slightly exteriorly of the plate 14 so that the welding seam line 20 is an annular trough, right angular in cross-sectional shape, defined between the tube terminal 16 and the plate 14.

The machine has a welding head assembly generally indicated by the numeral 24 on a tubular frame portion or body 22 with a pair of brackets 26 and 28, of insulative material adjustably supporting a welding rod feed tube connected to a carbon dioxide or inert gas conduit 32. The tube 30 carries the gas to a gas shield 34 which encircles the welding rod 37. The immediately above-mentioned conduit are conventional and are not claimed herein as novel per se, it being understood that the disclosed apparatus will be used with presently available auxilliary apparatus such as sources of inert gas, a welding rod reel and feed control and a source of electric current with the necessary complement of safety controls. As illustrated, the electric power lead 36 is connected as at 38 to the welding rod feed tube 30.

The machine has an arbor assembly 40 for removable securement in the boiler or condenser tubes 18. An essential feature of this arbor assembly is that it must contact the successive tubes 18 not only adjacent to each terminal 16 but also at points deeper into the tubes to assure stability. This can be accomplished as illustrated by elongated members 42 loosely retained between opposed and spaced headers 44 - 46 of the arbor and urged radially outwardly by wedge means such as cones 48 on a push-pull rod 50 disposed for frictional engagement with inclined planes 52 on the members 42 when the push-pull rod 50 is manually raised, thus locking the machine in the pipe 18. Spanner structure such as the illustrated bars 54 connect the headers 44 and 46 and in an alternative form of arbor this spanner structure is tubular adjacent the cones 48 and is apertured for loose retention of ball bearings, not shown, in lieu of the illustrated elongated members 42; the operation being substantially similar. The upper header 44 is secured directly to what can be considered the lower end of the tubular frame or body portion 22.

A third bracket 56 supports the flexible gas conduit 32 and electric power lead 36 and directly or indirectly may support a manual control panel 58 which will in practice be connected to the current source, not shown, to enable the operator to control current to the power lead 36 and to electric cable 60 connected to the motor 62.

The motor 62 is operatively mounted in a housing 64 which may carry the bracket 56 and the motor driven gear 66 which revolves around the ring gear 68 fixed to the tubular body 22 thus driving the housing 64, brackets 56, 26, and 28 and welding head 24 around the tubular body 22 as the latter is held fixed by the arbor 40. The motor 62 is of the variable speed type so that weldments of different radii can be made without deviating from the optimal linear welding speed. The brackets 56 and 26 have a common bearing block 70 which rides on bearing ring 72 while the bracket 28 has a cylindrical bearing 74 which rides on a bearing ring 76, the bearing rings 72 and 76 being fixed to the tubular body 22.

To bias the arbor elements 42 into locking engagement with the tube 18 the push-pull rod 50 is urged to move longitudinally by a spring 78 compressed between a knob terminal 80 on the push rod 50 and a slide 82 on the push rod 50. To drive the slide 82 into spring-compressing position there is provided a lever operated cam 84 pivoted as at 87 to operate against a boss on the end of the tubular body 22.

To aid in positioning the machine so that the welding rod tip 88 is properly spaced from the welding seam line 20 between the terminal 16 and the plate or sheet 14, there is provided a simple height gage bar 90 pivoted to a support 92 attached to the bearing block 70. The gage bear 90 contacts the plate or sheet 14 and limits the downward entry of the arbor into the tube 18 to enable repetitive proper placement of the machine for uniform welds. After such placement the gage bar 90 can be pivoted upward out of the way if desired as illustrated in the drawing.

I claim:

1. A portable welding machine for welding terminals of tubes to a metal plate along an annular seam line around each terminal, said machine comprising:
    a. an elongated tubular body having a welding rod feed and a welding head assembly including a welding tip;
    b. an arbor assembly for securement in a tube adjacent to said terminal;
    c. said body being mounted on said arbor assembly for rotation of the body through 360° relative to said arbor assembly to carry said welding tip along said weld seam line;
    d. said arbor including a plurality of parallel elongated elements radially expansible within one of said tubes to frictionally engage the interior walls of same, said elongated elements each having a pair of notches spaced along the inner edge thereof, and said arbor further including a pair of spaced conical wedges disposed in said notches and capable of expanding said elongated elements into tube-engaging position displaced upwardly;
    e. a push-pull rod connected to said wedges and extending through said tubular body;
    f. said push-pull rod having a terminal knob and a coil spring engaged on said rod contacting said knob;
    g. a manually operable camming lever to hold said push-pull rod in two positions selectively to lock said tube-engaging elements in tube-engaging position and to release same whereby a plurality of tubes can be rapidly welded in sequence;
    h. a drive motor mounted on said body and engaging same for rotation thereof relative to said arbor assembly; and
    i. a height gauge bar pivotally mounted to said body and of length dimension to precisely space said body from said plate when extended toward said plate and pivotal to a position clear of said plate for operation of said welding machine.

* * * * *